United States Patent [19]

Ruf

[11] Patent Number: 5,085,805
[45] Date of Patent: Feb. 4, 1992

[54] ELECTRICALLY CONDUCTING, IR REFLECTING, FLUORINE-DOPED TIN OXIDE ORGANIC COMPOUND

[75] Inventor: Erich Ruf, Essen, Fed. Rep. of Germany

[73] Assignee: Th. Goldschmidt AG

[21] Appl. No.: 675,797

[22] Filed: Mar. 27, 1991

Related U.S. Application Data

[62] Division of Ser. No. 492,087, Mar. 12, 1990, Pat. No. 5,043,186.

[30] Foreign Application Priority Data

May 10, 1989 [DE] Fed. Rep. of Germany ........ 3915232

[51] Int. Cl.$^5$ ............................................. C03C 17/25
[52] U.S. Cl. .................... 252/518; 106/287.19; 65/60.52; 65/60.5
[58] Field of Search .................. 106/298.19; 65/60.52; 65/60.5; 252/518

[56] References Cited

U.S. PATENT DOCUMENTS 3,759,743 9/1973 Menke ............................. 427/126.2

*Primary Examiner*—Mark L. Bell
*Assistant Examiner*—C. Melissa Bonner
*Attorney, Agent, or Firm*—Toren, McGeady & Associates

[57] ABSTRACT

A method and composition are disclosed for the production of electrically conducting, IR reflecting, fluorine-doped tin oxide layers on surfaces of a glass or ceramic objects or of enamel coatings. The method comprises applying an organic solution of a mixture of alkyltin oxide and trifluoroacetic acid to the surface, which has been heated to 400° to 700° C., wherein trifluoroacetic acid is present in the solution in a substoichiometric amount. The composition useful for carrying out the method comprises an organic solution of alkyltin oxide and trifluoroacetic acid in a substoichiometric amount relative to the alkyltin oxide. Variable doping with fluorine and, with that, optimization of the surface resistance value as well as of the IR reflection become possible by means of the invention.

4 Claims, No Drawings

ELECTRICALLY CONDUCTING, IR REFLECTING, FLUORINE-DOPED TIN OXIDE ORGANIC COMPOUND

This is a division of application Ser. No. 07/492,087 filed Mar. 12, 1990, now U.S. Pat. No. 5043186, issued 27 Aug. 199.

BACKGROUND OF THE INVENTION

This invention relates to a method for the production of electrically conducting, IR reflecting, fluorine-doped tin oxide layers on the surface of glass or ceramic objects or of enamel coatings, and more particularly, this invention concerns a method of applying a solution containing a mixture of alkyltin oxide and trifluoroacetic acid to such a surface, wherein the surface has been heated to 400° to 700° C. The invention also relates to an appropriate composition for the application of electrically conductive, IR reflecting layers on the surface of glass, ceramic or enamel for the implementation of the method of the invention.

It is well known that fluorine-doped tin oxide layers on surfaces of glass, ceramic or enamel decrease the electrical resistance of the coated surfaces and increase the infrared reflection. To produce such tin oxide layers, combinations of suitable tin compounds with fluorine-containing substances or fluorine-containing tin compounds are brought into contact with surfaces heated to 400° to 800° C. A coherent tin oxide layer, which is doped with fluorine, is formed on the glass, ceramic or enamel surface. The fluorine doping is of decisive importance for the desired properties of the coated surfaces, such as increased conductivity and IR reflection.

Spraying solutions of suitable tin and fluorine containing compounds onto surfaces to be coated is a particularly simple method for the application of fluorine-doped tin oxide layers.

In German Offenlegungsschrift 22 46 193, a method for the production of transparent, electrically conducting films on glass surfaces is disclosed. For this method, a solution of an organotin salt of trifluoroacetic acid in methyl ethyl ketone is used. These organotin salts are prepared, for example, from tin(II) oxide, dibutyltin diacetate, dibutyltin oxide or tributyltin oxide, by heating for several hours with an excess of trifluoroacetic acid or other perfluorinated monocarboxylic acids. The excess perfluorinated acid and the water of reaction are thereupon distilled off and the residue is purified by recrystallization. The composition for applying fluorine-doped tin oxide layers in the claimed method is then prepared from the purified tin carboxylate compounds by dissolution in methyl ethyl ketone. Thus a method of several steps is required to prepare the coating solutions.

Tin carboxylates, prepared by the method described above, have a high fluorine content, which is invariable due to the molecular structure of these compounds. However, a high fluorine content in starting materials for the production of electrically conducting tin oxide layers on glass, ceramic or enamel surfaces brings about excessive doping with fluorine and causes a distinct deterioration of the properties desired in such laYers. For example, the surface resistance values attained by such tin oxide layers are between 32 and 65 ohm/-square. However, lower surface resistance values are desired.

Because of the given invariable molecular structure, it is not possible to adjust the fluorine doping in the layers to an optimal value using the materials disclosed in German Offenlegungsschrift 22 46 193, namely the tin carboxylates of trifluoroacetic acid or the analogous higher perfluorinated monocarboxylic acids and the compositions produced from these materials for the surface treatment of glass.

SUMMARY OF THE INVENTION

It is therefore an object of the invention to provide an improved method for the production of electrically conducting, IR reflecting, fluorine-doped tin oxide layers on glass, ceramic or enamel surfaces.

Another object of the invention is to provide a method for applying an organic solution of suitable alkyltin oxides and trifluoroacetic acid, whereby variable fluorine doping and, with that, optimization of the surface resistance value as well as of the IR reflection are obtained.

A further object of the invention is the provision of a composition for applyiny electrically conductive. IR reflecting layers on the surface of glass, ceramic or enamel, whereby the resultant layers will have the desired properties, including optimization of the surface resistance value and IR reflection.

These objects and others are accomplished by the method and composition of the invention described below.

Surprisingly, it has been found that the disadvantages of the method of the tYpe initially described are overcome by using therein a solution of alkyltin oxide and trifluoroacetic acid in which the trifluoroacetic acid is present in a substoichiometric amount.

According to the invention, electrically conducting, IR reflecting, fluorine-doped tin oxide layers are produced on the surface of glass or ceramic objects or of enamel layers by applying an organic solution of a mixture of alkytin oxide and trifluoroacetic acid to the surface, after heating the surface to 400° to 700° C., wherein the organic solution used comprises a mixture of alkytin oxide and trifluoroacetic acid in which the trifluoroacetic acid is present in a substoichiometric amount.

According to a further aspect of the invention, the composition used to produce electrically conducting, IR reflecting, fluorine-doped tin oxide layers on surfaces is an organic solution containing 50 to 80% by weight of a mixture of alkyltin oxide and trifluoroacetic acid, wherein the trifluoroacetic acid is present in a substoichiometric amount with respect to the alkyltin oxide.

DETAILED DESCRIPTION OF THE INVENTION

To those skilled in the art, it was surprising to discover that the combination of alkYltin oxide and a substoichiometric amount of trifluoroacetic acid forms a clear solution even at room temperature when stirred in a neutral organic solvent. In contrast, German Offenlegungsschrift 22 46 193 specifies that to prepare the corresponding alkyltin carboxylates, the alkYltin oxides and trifluoroacetic acid should be heated for several hours in stoichiometric amounts.

The method of the invention thus provides several advantages, including that the composition used for applYing electrically conductive, IR reflecting layers to the surface of glass, ceramic or enamel can be produced by a method which consists of only one step and for which neither expensive equipment nor the input of external energy is required. Moreover, due to the use of substoichiometric amounts of trifluoroacetic acid, a reduction in the material consumption and a lowering of the costs are achieved.

Moreover, since solutions of alkyltin oxides with substoichiometric amounts of trifluoroacetic acid can be produced over a wide range of different molar ratios, the fluorine present can be adjusted to a defined amount according to appropriate standards. Fluorine doping of the tin oxide layers to be applied, accordingly, is accurately controllable by varying the molar ratio in the solutions used.

The alkyltin oxides preferably used are those having an alkyl group with 1 to 5 carbon atoms and especially 4 carbon atoms. The use of mono-, di- or tributyltin oxide is particularly preferred.

According to German Offenlegungsschrift 22 46 193, defined salts are produced by a stoichiometric reaction of mono-, di- or tributyltin oxide with trifluoroacetic acid. The reaction of trifluoroacetic acid with monobutyltin oxide in the molar ratio of 1 : 3 yields monobutyltin tris(trifluoroacetate), $C_4H_9(CF_3COO)_3Sn$; with dibutyltin oxide in the molar ratio of 1 : 2 yields dibutyltin bis(trifluoroacetate), $(C_4H_9)_2(CF_3COO)_2Sn$, and with tributyltin oxide (hexabutyl distannoxan) in the molar ratio of 1 : 2 yields tributyltin trifluoroacetate, $(C_4H_9)_3(CF_3COO)Sn$. However, because of their high and unvarying fluorine content, these salts have the disadvantage of producing excessive doping with fluorine and, associated with that, a deterioration in the properties in the tin oxide layers produced with their solutions.

Preferably, the reduction in the fluorine content is achieved according to the method of the invention by using a solution with substoichiometric amounts of trifluoroacetic acid, which contains:

a) monobutyltin oxide and trifluoroacetic acid in a molar ratio of monobutyltin oxide : trifluoroacetic acid which ranges from 1 :<3 to 1 : 0.15, or b) dibutyltin oxide and trifluoroacetic acid in a molar ratio of dibutyltin oxide : trifluoroacetic acid which ranges from 1 :<2 to 1 : 0.74, or c) tributyltin oxide and trifluoroacetic acid in a molar ratio of tributyltin oxide : trifluoroacetic acid which ranges from 1 :<2 to 1 : 0.15.

According to the invention, clear solutions of the alkyltin oxides and trifluoroacetic acid are formed when these components are present in the defined molar ranges. Clear solutions are indispensable for problem-free application and ensure a homogeneous tin oxide layer, which is free of any cloudiness.

However, to avoid excessive doping with fluorine, a composition should be selected which lies clearly below that specified by the butyltin carboxylates, which are prepared by the stoichiometric reaction of butyltin oxides and trifluoroacetic acid.

Particularly preferred for the inventive method is the use of solutions, which contain:

a) monobutyltin oxide : trifluoroacetic acid in a molar ratio of 1 :<2 to 1 : 0.15, or b) dibutyltin oxide : trifluoroacetic acid in a molar ratio of 1 :<1.5 to 1 : 0.74, or c) tributyltin oxide : trifluoroacetic acid in a molar ratio of 1 :<1.5 to 1 : 0.15.

Different organic solvents can be used for the preparation of the solutions used for the inventive method. Preferred are ethyl acetate or methyl ethyl ketone or their mixtures.

Compositions of the invention used for the application of electrically conductive, IR reflecting layers on the surface of glass, ceramic or enamel contain 50 to 80% by weight of a mixture of alkyltin oxide and trifluoroacetic acid which has been dissolved in an organic solvent. Among the preferred compositions of the invention are those which contain:

a) monobutyltin oxide and trifluoroacetic acid in a molar ratio of monobutyltin oxide : trifluoroacetic acid which ranges from 1 :<3 to 1 : 0.15;

b) dibutyltin oxide and trifluoroacetic acid in a molar ratio of dibutyltin oxide : trifluoroacetic acid which ranges from 1 :<2 to 1 : 0.74 or c) tributyltin oxide and trifluoroacetic acid in a molar ratio of tributyltin oxide : trifluoroacetic acid which ranges from 1 :<2 to 1 : 0.15.

For optimum doping of tin oxide layers with fluorine according to the inventive method, compositions are particularly preferred, which contain:

a) monobutyltin oxide : trifluoroacetic acid in a molar ratio of 1 :<2 to 1 : 0.15;

b) dibutyltin oxide : trifluoroacetic acid in a molar ratio of 1 :<1.5 to 1 : 0.74 or c) tributyltin oxide : trifluoroacetic acid in a molar ratio of 1 :<1.5 to 1 : 0.15.

Different organic solvents can be used to produce the compositions of the invention. Ethyl acetate or methyl ethyl ketone or their mixtures are preferred. The inventive compositions are produced simply by adding the components together and stirring at room temperatures; a clear solution is obtained after only 5 to 15 minutes.

Particularly surprising in this connection is the fact that monobutyltin oxide and dibutyltin oxide, which are largely insoluble in ethyl acetate, can be brought into solution by the addition of small amounts of trifluoroacetic acid. In the case of monobutyltin oxide, even the addition of trifluoroacetic acid in a molar ratio of monobutyltin oxide : trifluoroacetic acid of 1 : 0.15 is sufficient to produce a clear solution.

An especially preferred example of a composition of the invention useful to produce fluorine-doped tin oxide layers according to the inventive method is a solution, which consists of:

40 to 70% by weight of butyltin oxide
3 to 20% by weight of trifluoroacetic acid and
10 to 57% by weight of ethyl acetate and/or methyl ethyl ketone.

To carry out the inventive method, the composition of the invention is applied, advisably with a spray gun, by means of a spraying method using compressed air on the surface of glass, ceramic or enamel, which has been heated to 400° to 700° C. The temperature must be below the melting or softening temperature of the material that is to be coated.

A tin oxide film doped with fluorine is produced on the surface by pyrolysis. Depending on the amount of inventive composition employed, a film that is 100 to 1,000 nm thick is obtained. The layers, thus produced, have clearly lower surface resistances than do those known from the art. Values of 8 to 15 ohm/square are measured for layers 300 to 400 nm thick.

The layers, prepared by the inventive method, have excellent transparency on glass. These layers are largely transparent to light in the visible range, while 83 to 90% of IR radiation above 2,500 nm is reflected by a layer 300 to 400 nm thick.

The following examples further illustrate the best mode currently contemplated for carrying out the invention, but these examples must not be construed as limiting the invention in any manner.

EXAMPLE 1

Monobutyltin oxide (80.2 g) is dispersed in 85.8 g of ethyl acetate in a 200 ml beaker, which is provided with a magnetic stirrer. To this dispersion, 34.0 g of trifluoroacetic acid are added with stirring. The dispersion heats up to about 50° C. After about 15 minutes, a clear solution is obtained. When this solution has cooled to room temperature, 5 ml are added to the beaker of a spray gun and sprayed onto a flat glass pane (160 mm×180 mm×6 mm), which previously had been heated for 6 minutes in an oven at a temperature of about 700° C. The glass plate, so coated, has the following values:
Surface resistance: 13 ohm/square.
IR reflection: 83%.
Layer thickness: 350 nm.

EXAMPLE 2

Dibutyltin oxide (100 g) is dispersed in 66 g of ethyl acetate in a 200 ml beaker, which is provided with a magnetic stirrer. To this dispersion, 34 g of trifluoroacetic acid are added with stirring. The dispersion heats up to about 50° C. After about 15 minutes, a clear solution is obtained. When this solution has cooled to room temperature, 6 ml are added to the beaker of a spray gun and sprayed onto a flat glass pane (160 mm×180 mm×6 mm), which previouslY had been heated for 6 minutes in an oven at a temperature of about 700° C. The glass plate, so coated, has the following values:
Surface resistance: 10.4 ohm/square.
IR reflection: 88%.
Layer thickness: 400 nm.

EXAMPLE 3

Tributyltin oxide (119.8 g) is dispersed in 45.48 g of ethyl acetate in a 200 ml beaker, which is provided with a magnetic stirrer. To this dispersion, 34.36 g of trifluoroacetic acid are added with stirring. The dispersion heats up to about 50° C. After about 5 minutes, a clear solution is obtained. When this solution has cooled to room temperature, 5 ml are added to the beaker of a spray gun and sprayed onto a flat glass pane (160 mm×180 mm×6 mm), which previously had been heated for 6 minutes in an oven at a temperature of about 700° C. The glass plate, so coated, has the following values:
Surface resistance: 9 ohm/square.
IR reflection: 90%.
Layer thickness: 400 nm.

EXAMPLE 4

Tributyltin oxide (119.8 g) is dispersed in 45.48 g of ethyl acetate in a 200 ml beaker, which is provided with a magnetic stirrer. To this dispersion, 34.36 g of trifluoroacetic acid are added with stirring. The dispersion heats up to about 50° C. After about 5 minutes, a clear solution is obtained. When this solution has cooled to room temperature, 5 ml are added to the beaker of a spray gun and sprayed onto an enameled sheet of steel (100 mm×100 mm×1.5 mm), which previously had been heated for 6 minutes in an oven at a temperature of about 700° C. The enameled sheet of steel, so coated, has the following values:
Surface resistance: 8 ohm/square.
IR reflection: 65%.
Layer thickness: 440 nm.

EXAMPLE 5

Tributyltin oxide (119.8 g) is dispersed in 45.48 g of ethyl acetate in a 200 ml beaker, which is provided with a magnetic stirrer. To this dispersion, 34.36 g of trifluoroacetic acid are added with stirring. The dispersion heats up to about 50° C. After about 5 minutes, a clear solution is obtained. When this solution has cooled to room temperature, 5 ml are added to the beaker of a spray gun and sprayed onto an unglazed fragment of ceramic (110 mm ×110 mm×4 mm), which previouslY had been heated for 6 minutes in an oven at a temperature of about 700° C. The unglazed fragment of ceramic, so coated, has the following value:
Surface resistance: 15 ohm/square.

The tin oxide layers, applied on different substrates according to the method of the invention using a composition of the invention, have surface resistance values of 8 to 15 ohm/square at thickness of 300 to 400 nm. These values thus are a clear improvement over the values of 45 to 65 ohm/square, which are known for a comparable layer thickness from German Offenlegungsschrift 22 46 193.

We claim:

1. A composition for applying electrically conductive, IR reflecting layers on the surface of glass, ceramic or enamel comprising a solution of 50 to 80% by weight of mixture of alkyltin oxide and trifluoroacetic acid dissolved in an organic solvent, wherein the mixture of alkyltin oxide and trifluoroacetic acid is selected from the group consisting of
   a) monobutyltin oxide and trifluoroacetic acid in a molar ratio of monobutyltin oxide : trifluoroacetic acid ranging from 1 :<3 to 1 : 0.15,
   b) dibutyltin oxide and trifluoroacetic acid in a molar ratio of dibutyltin oxide : trifluoroacetic acid ranging from 1 :<2 to 1 : 0.74 or
   c) tributyltin oxide and trifluoroacetic acid in a molar ratio of tributyltin oxide : trifluoroacetic acid ranging from 1 :<2 to 1 : 0.15.

2. The composition of claim 1, in which the solution contains a mixture of alkyltin oxide and trifluoroacetic acid selected from the group consisting of
   a) monobutyltin oxide : trifluoroacetic acid in a molar ratio of 1 :<2 to 1 : 0.15,
   b) dibutyltin oxide : trifluoroacetic acid in a molar ratio of 1 :<1.5 to 0.74 or
   c) tributyltin oxide : trifluoroacetic acid in a molar ratio of 1 :<1.5 to 1 : 0.15.

3. The composition according to claim 1 in which the solvent is ethyl acetate, methyl ethyl ketone or a combination thereof.

4. The composition according to claim 2 in which the solvent is ethyl acetate, methyl ethyl ketone or a combination thereof.

* * * * *